US012755419B2

(12) United States Patent
Zhang et al.

(10) Patent No.: US 12,755,419 B2
(45) Date of Patent: Oct. 6, 2026

(54) OBJECTS REMOVAL FROM VIDEO FRAMING

(71) Applicant: Hewlett-Packard Development Company, L.P., Spring, TX (US)

(72) Inventors: Peter Siyuan Zhang, Spring, TX (US); King Sui Kei, Spring, TX (US); Conrad Walter Henry, Jr., Spring, TX (US)

(73) Assignee: Hewlett Packard Development Company, L.P., Spring, TX (US)

( * ) Notice: Subject to any disclaimer, the term of this patent is extended or adjusted under 35 U.S.C. 154(b) by 379 days.

(21) Appl. No.: 18/347,166

(22) Filed: Jul. 5, 2023

(65) Prior Publication Data

US 2025/0014211 A1 Jan. 9, 2025

(51) Int. Cl.

*G06T 7/73* (2017.01)
*G06T 7/11* (2017.01)
*G06V 10/25* (2022.01)
*G06V 40/16* (2022.01)

(52) U.S. Cl.

CPC .................. *G06T 7/73* (2017.01); *G06T 7/11* (2017.01); *G06V 10/25* (2022.01); *G06V 40/168* (2022.01)

(58) Field of Classification Search

CPC ............. G06T 7/73; G06T 7/11; G06V 10/25; G06V 40/168; G06V 40/161

See application file for complete search history.

(56) References Cited

U.S. PATENT DOCUMENTS 7,057,636 B1 * 6/2006 Cohen-Solal ......... G01S 3/7864 348/E7.083
8,289,363 B2 * 10/2012 Buckler ................... H04N 7/15 348/14.09
10,242,282 B2 3/2019 Loce et al.
10,404,924 B2 * 9/2019 Breuer ................. G08B 13/194
11,425,335 B2 8/2022 Lemes Da Silva et al.
12,184,916 B2 * 12/2024 Turbell .............. H04N 21/4223
2015/0186751 A1 7/2015 Mosier
2017/0103285 A1 4/2017 Le Borgne et al.
2022/0237735 A1 * 7/2022 Zingade ................ G06T 3/4038
2022/0245189 A1 8/2022 Thierry et al.

(Continued)

FOREIGN PATENT DOCUMENTS

CN 108228742 A 6/2018

*Primary Examiner* — Matthew C Bella

(74) *Attorney, Agent, or Firm* — Quarles & Brady LLP

(57) ABSTRACT

An electronic device comprising a plurality of sensors and a plurality of video capturing sensors and a processor for determining if an object within the field of view (FOV) of the electronic device is an organic being or a two-dimensional (2D), or three-dimensional (3D) representation of an organic being and if the representation of the being is displayed on a digital screen. The processor is configured to remove the representation of an organic being within the FOV of the electronic device by way of determining the liveness, 2D/3D, and position of an object from the plurality of sensors that may be placed within the electronic device. The determination of removing a representation of an organic being can be determined by an onboard processor or by a cloud-based processor and the determination not to remove the detected organic being is represented by video conference framing of that organic being.

20 Claims, 8 Drawing Sheets

(56) References Cited

U.S. PATENT DOCUMENTS

| | | | | |
|---|---|---|---|---|
| 2023/0106330 | A1* | 4/2023 | Oz | H04N 7/144 345/419 |
| 2023/0137265 | A1* | 5/2023 | Thiel | G06T 15/20 348/14.08 |

* cited by examiner

OBJECTS REMOVAL FROM VIDEO FRAMING

BACKGROUND

A video conferencing system can include a number of electronic devices that exchange information among a group of participants. Examples of electronic devices include, but are not limited to, mobile phones, tablets, base stations, network access points, customer-premises equipment (CPE), laptops, cameras, and wearable electronics. In some scenarios, electronic devices can include input devices, output devices, or a combination that allows for the exchange of content in the form of audio, video, or a combination of audio and video data. The exchange of content may be facilitated through software applications, generally referred to as conference applications, communication networks, and network services.

Some video conferencing devices can incorporate artificial intelligence (AI)-based systems for video conference functionality. For example, video conferencing system can include functionality for object detection, movement processing, face detection, and the like.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
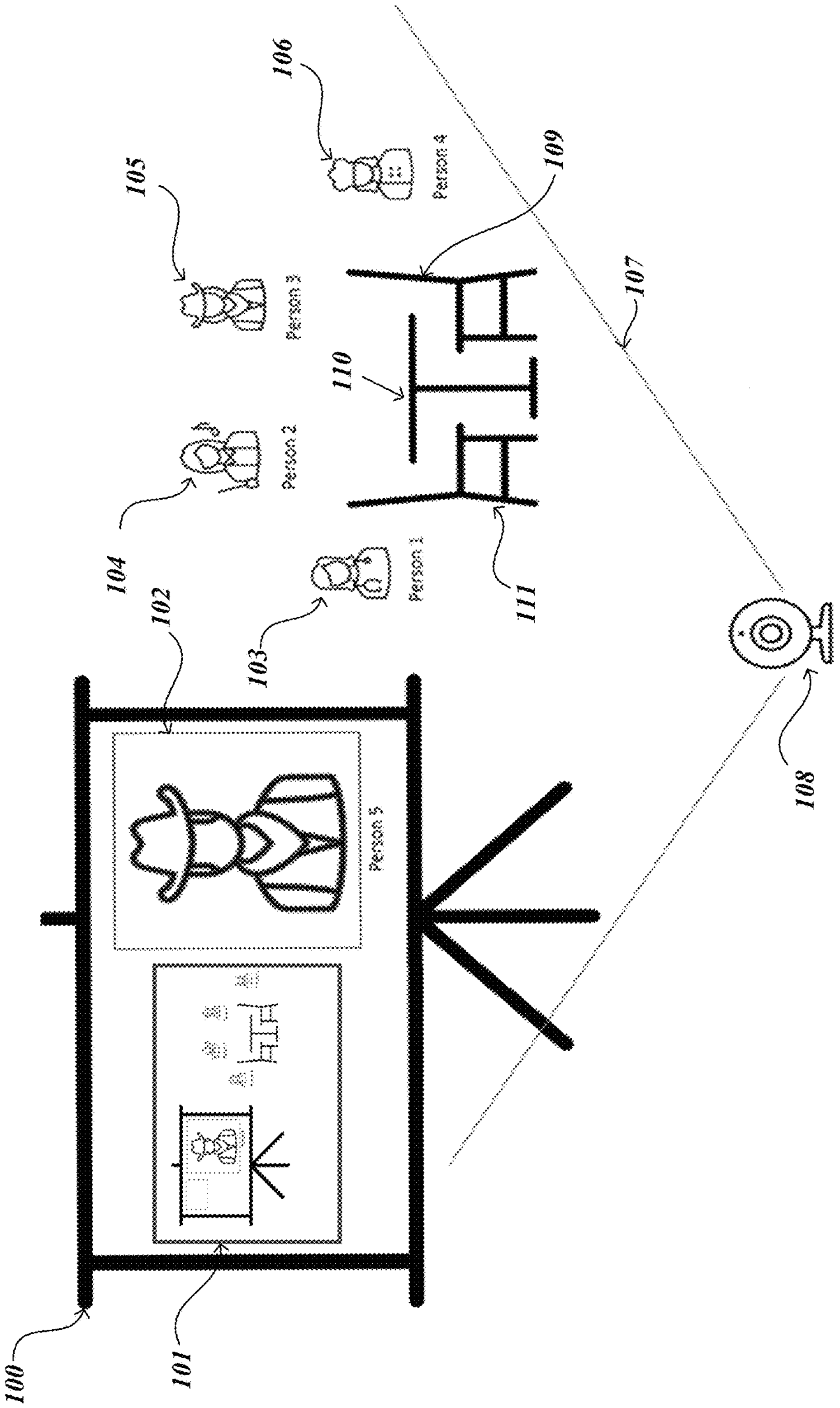
FIG. 1 is a pictorial depiction of a video conferencing system including a plurality of objects for detection in the field of view of a video camera device, according to an example.

Certain examples described herein provide a system and method for identifying instances of people within a field of view of a conferencing device and providing a solution to remove instances of objects determined not to be a person detected. Generally, aspects relate to the utilization of instance segmentation and onboard AI algorithms to identify characterized attributes of detected objects as well as object identification and count. Such aspects can include but are not limited to using various sensors such as image capture sensors, video capture sensor, distance sensors, etc. for object detection. Other aspects further include using the various sensors to determine characterized attributes of detected objects for a determination process for removing objects based on the characterized attributes detected from displaying during a conference call.

With reference to the general example, when objects with characterized attributes are detected, the video conferencing device determines if an individual object satisfies a specified requirement based on the characterized attributes. The objects that do not satisfy the requirements are removed from the conferencing calling for an optimized video conferencing experience.

Video conferencing devices are widely used electronic devices that are typically deployed within a conferencing room and connect to a host application where the host application is communicating with other participants around the world via the internet. The host application is displayed on a digital monitor and is comprised of a user interface that displays the participant's video stream, audio stream, and a presentation of a participant who has opted to present during the video conference. Video conferencing devices typically display everything in the field of view (FOV) of the camera sensors on the host application. As applied to video conferencing applications, many of the objects detected within the FOV of the image sensors correspond to organic beings (e.g., individuals) that are participating in the video conference and are intending to be captured by the camera sensors. Additionally, additional non-organic or inanimate objects may also be captured and represented in the FOV of the camera sensors.

Many of the detected non-organic objects, such as furniture or fixtures, are also intended to be captured as part of the video conference application. However, some subsets of non-organic objects that are also capable/configured to generate content such as television monitors, computing device screens, etc., may also be captured in the FOV. If such a subset of non-organic objects are also providing content from the video conference application, representation of such a subset of non-organic detected objects will typically generate video looping scenarios and may cause the video conference application to result in dual-person detection. The dual-person detections can come from a digital representation of a person participating in a conferencing event, where the conferencing devices capture an image of the person twice and present it on a digital monitor, creating a looping effect. Unintended video looping can tend to interrupt or disrupt video conferencing application functionality, such as causing errors associated with dual individual recognition. For example, a video conferencing application may have difficulty focusing on an individual speaking if face mapping functionality determines that two individuals (e.g., the organic being and the non-organic representation of the being) are both present in the FOV. This can lead to errors in the video conferencing application or incorrect focus on the non-organic representation. In another example, the execution of a video conferencing application may require additional computing device resources to process video imaging data, including increased processing resources, memory resources, etc. utilized to process the looping video feed (e.g., a video of the video being generated).

The aforementioned inadequacy of the typical video conferencing device, among others, is addressed in some examples by the disclosed technique of a video conferencing device processing additional sensor data, also sometimes referred to in this description as an electronic device.

Examples described herein provide an electronic device capable of processing image sensor data for detecting objects within a FOV of an electronic device. The electronic device can be fitted with a plurality of image-capturing sensors housed locally to the electronic device. The plurality of image-capturing sensors can also be located remotely to the election device and communicate with the electronic device via a wired or wireless communication system.

Based on the processed image-capturing sensor data, the electronic device can then attempt to characterize detected objects, such as those related to organic beings or non-organic representations of organic beings (e.g., non-organic objects that may otherwise be represented/detected as organic beings). The electronic device processes the image sensor data and detects all objects within a FOV of the electronic device. Illustratively, based on the detection of an object, the electronic device assigns a unique identifier to each identified object creating an instance segmentation. The electronic device is also configured for facial recognition of an object with respect to facial tracking and produces a unique facial identifier of an organic being. Facial recognition can utilize lip and eye movement as well as variable focus analysis for determining the presence of a face.

As an object traverses across the FOV of an electronic device the processor maintains the unique identifier with respect to the object. Facial recognition can determine a facial identifier, with respect to a detected face, of an organic being of the same face detected previously. In an instance where the processor determines a unique identifier matches a second unique identifier, a duplicate facial identifier is present, the processor removes the duplicate facial identifier from video conference framing. Object detection is also utilized to differentiate objects within a FOV of the electronic device as being inanimate objects, such as a digital screen that is projecting images of organic beings. The processor is configured to remove sensor data of a captured digital display to prevent looping of the video conferencing, preventing the video conferencing to display any presentation on a screen that is within the FOV of an electronic device.

Responsive to processed image capture data (e.g., detected objects), sometimes also referred to as video sensor data, the electronic device initiates a sequence of tests about the objects detected to determine if the detected object is an organic being, retrieving sensor data from a plurality of distance sensors, image sensors, thermal sensors, and various other sensors. The processor begins processing sensor data and determines if the detected object is a two-dimensional (2D) or three-dimensional (3D) model by utilizing a plurality of Indirect Time of Flight (IToF) sensors, depth camera, and image-capturing sensors. The determination of an object represented in a 2D model is met with the processor removing sensor data of the 2D model from the video conference framing and may be removed from further tests for determining if the object is an organic being. The determination of a 3D model can be determined to include the object in the video conference framing and/or perform further tests in determining whether the object is an organic being. The plurality of ITOF sensors, depth cameras, and image-capturing sensors, can be housed within the electronic device, or located remotely and communicate with the electronic device via a wired or wireless communication system.

Furthermore, the processor begins processing sensor data to determine the liveness of the object detected utilizing the plurality of image-capturing sensors and/or infrared (IR) cameras. The liveness test determines the facial characteristics of an object and can discern if an object has been detected that comprises a face, such as an image on a wall, a digital representation of an organic being, or a mannequin, is not an organic being. The liveness test further determines that the heat signatures from attributed temperatures, captured from infrared camera, further distinguishes between an organic being or a mannequin. The heat signatures of the organic beings, as part of an environmental attribute, are further compared with other organic beings (i.e., dog) within the FOV of the electronic device. The liveness test process the detected heat signatures and identifies the heat signatures that correspond to that of a person.

Furthermore, the processor begins processing sensor data to determine the position of an object within the FOV of an electronic device. The determination of the object can be sensed by distance sensors (e.g., Infrared, LIDAR, Ultrasonic) and determine the relative position of an object if that object is located within a defined region of interest. The position of an object of the plurality of objects can also be determined by bounding box object detection and pixel information from the instance segmentation. Based on the determination of any individual or combination of determination of 2D/3D, liveness, and position, does the processor rule to include or exclude a detected object from a video conference framing. Where the video conference framing creates a bounded box on the host application and displays the determined organic being within an individual bounded box during the video conferencing.

In another example described herein provide an electronic device capable of processing additional sensor data to detect an organic being present within a conferencing room during a live conference call. The processor utilized to determine if an object is an organic being is a network-based processing component or service, where the electronic device communicates via a network protocol, the plurality of sensor data of the plurality of sensor to a cloud processor. Cloud processing can be utilized for any of the aforementioned processing completed by the onboard processor of the electronic device.

FIG. 1 is a pictorial depiction of a typical video conferencing system where the video conferencing system does not include the features of an illustrative embodiment of the electronic device. The video conferencing system includes a plurality of objects for detection in the field of view of a video conferencing device in accordance with various aspects of the present application. As shown the digital screen 100, the various objects 109, 110, and 111, and Person 1 103, Person 2 104, Person 3 105, and Person 4 106 are all in the field of view (FOV) 107 of a video conferencing device 108. The video conferencing device 108 captures the digital screen 100, the various objects 109, 110, and 111, and Person 1 103, Person 2 104, Person 3 105, and Person 4 106, and feeds it to a video conference that is ongoing. As shown on the digital screen 100 a loop framing 101 and a person, Person 5 102, is participating in the video conference virtually.

By way of illustration, as previously described, in a typical video conferencing system, the video conferencing device 108 creates an infinite loop of the image captured within the FOV 107. The loop framing 101 depicts an undesirable looping effect that is infinitely looping.

Figure 2:
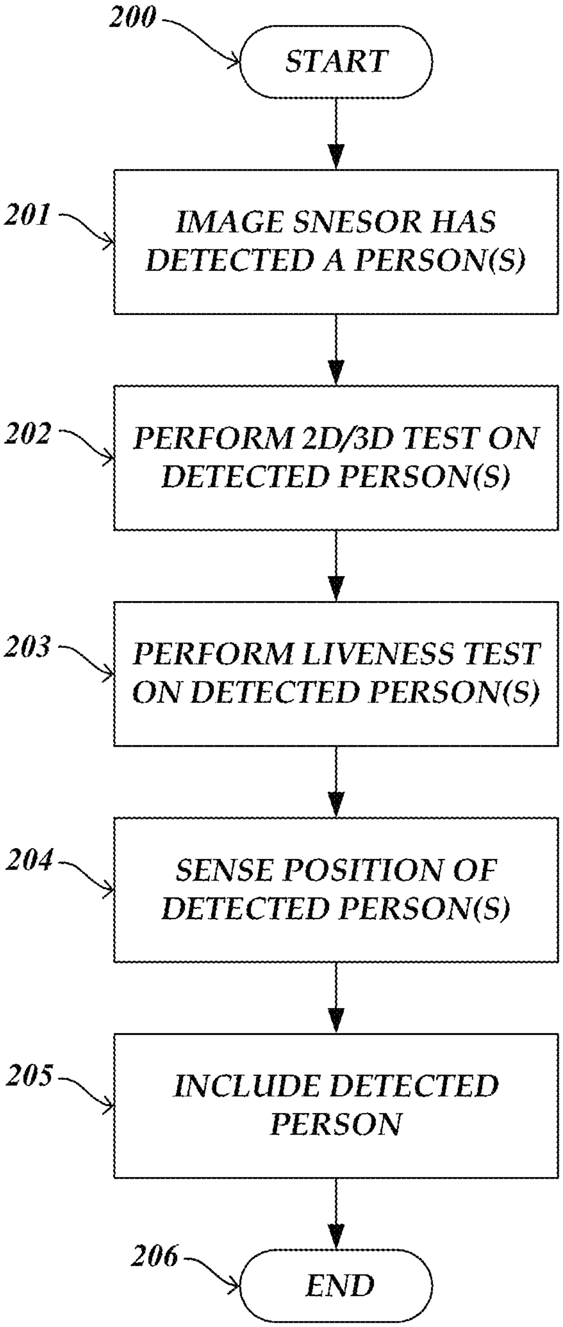
FIG. 2 is a flow diagram of a routine for a detected object exclusion routine in accordance with illustrative aspects of the present application.

FIG. 2 illustrates a flow diagram depicting an example of a processor determination routine 200 for including objects detected within a FOV of a video conferencing device determined to be an organic being, in a video conferencing event. The processor determination routine 200 illustrated in FIG. 2 may be illustratively implemented by an electronic device, such as the electronic device described with regard to FIG. 7 (below). Illustratively, the determination described in the routine of FIG. 2 is made based on the configurable requirements, and/or criterion, of the characterized attributes of the detected objects. This flow diagram can also inversely represent the removal of objects from the video conferencing event, detected by the video conferencing device, based on the configurable requirements of the characterized attributes.

At block 201, the conferencing device begins with a detection, for a determination, of objects within the FOV. The image sensors are used for detecting a plurality of objects within the FOV of the conferencing device by way of analyzing data collected from the image sensors. The processor identifies the plurality of objects within a FOV of the conferencing device by an algorithmic process of the data captured and specifies a unique identifier to an object within the plurality of objects.

At block 202, the conferencing device performs a test on the detected objects within the FOV of the conferencing device. Specifically, the conference device can determine whether the characteristics of the detected object are characteristic of a two-dimensional object (2D) or are characteristics of a three-dimensional object (3D), which may be generally referred to as a 2D/3D test. Illustratively, the 2D/3D tests can be performed by the conference device utilizing inputs from a plurality of Indirect Time of Flight (IToF) sensors, depth cameras, and image-capturing sensors. The conferencing device can process the sensor data to determine whether a detected object has characteristics or attributes that correspond to length, width, and height, which may be characterized as a three-dimensional object or indicate a two-dimensional object. Alternatively, if the detected object has characteristics of only length and width (and not height), the detected object may be characterized as two-dimensional (e.g., not likely an organic object).

By way of example, the 2D/3D test on the detected person(s) (block 202) is completed by way of utilizing an ITOF sensor comprised on the electronic device 311. As depicted in the FIG. 3 sensor S1 317, sensor S2 320, sensor S3 318, and sensor Sn 319 can be examples of the plurality of sensors that can be utilized for the 2D/3D test performed on an object. The 2D/3D test on the detected person(s) (block 202) can also be completed by way of utilizing a plurality of image-capturing sensors. As depicted in the FIG. 3, the image capture sensor 316, sensor S1 317, sensor S2 320, sensor S3 318, and sensor Sn 319 can be examples of the plurality of image-capturing sensors that are utilized for performing a 3D modeling of the captured sensor data and utilizing the captured sensor data for the processor determination.

At block 203, the conferencing device performs a liveness test on the plurality of detected objects. The conferencing device can be configured to perform a liveness test on objects that have been detected to be 3D, or on all the objects that have been detected within the FOV of the conferencing device. Generally described, a liveness test can correspond to one or more tests or techniques in which characteristics of a detected object correspond to real or actual signals generated by the detected object as opposed to reproduced signals, such as via a display mechanism.

Figure 3:
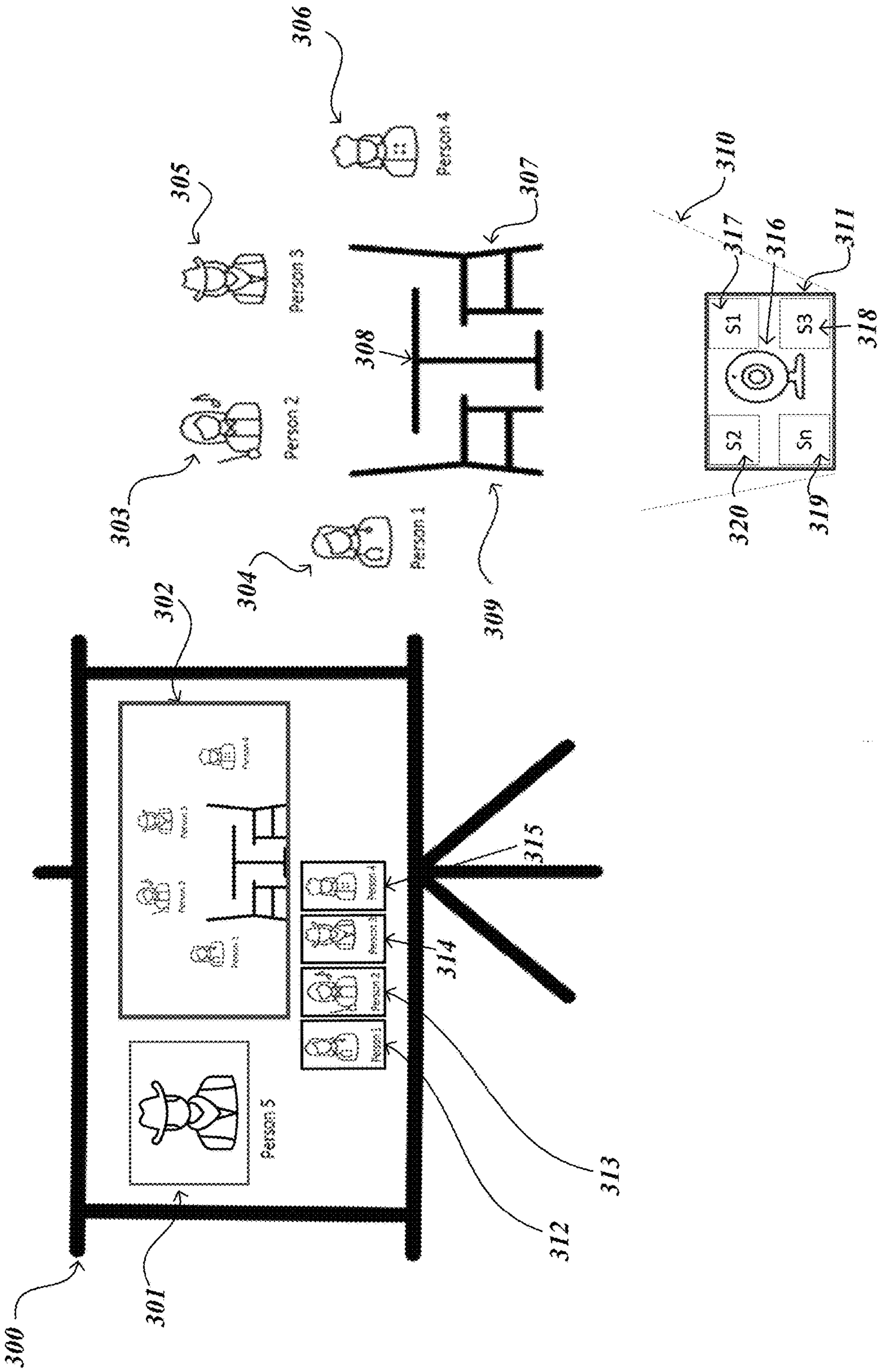
FIG. 3 is a pictorial depiction of a video conferencing system including a plurality of objects for detecting in the field of view of a video camera device, according to an example.

By way of example, performing a liveness test on the detected person(s) (block 203) is conducted utilizing the image capturing sensor, as depicted in FIG. 3 with image capture sensor 316, sensor S1 317, sensor S2 320, sensor S3 318, and sensor Sn 319 can be examples of the plurality of image capturing sensors that are utilized for performing a liveness test. The image-capturing sensors can be utilized for facial recognition and perform facial tracking to detect organic facial feature movements (e.g., blinking eyes, movement of lips, movement of head position). The image-capture sensor data may be used to determine a pattern of apparent motion that is detected by processing a plurality of consecutive frames of the image capture sensor data. By way of organic facial feature movements, the sensor data obtained from the image-capturing sensors are utilized to perform the liveness test, where the determination can detect if the facial feature movements are of an organic being or a representation of an organic being by way of a digital display or 3D model of an organic being.

At block 204, the conferencing device performs a position determination of the plurality of objects detected and determines if the liveness test results should be excluded from the determination process or included based on the location of the objects within the FOV. Illustratively, the FOV of the conferencing device can be organized into one or more zones, such as according to defined geometric shapes, physical boundaries, non-geometric shapes, etc. In accordance with illustrative embodiments, individual zone or regions may be associated with a likelihood of whether a detected object will correspond to an organic or non-organic object. In some embodiments, individual zones or regions may be associated with a likelihood that an organic object may be present. For example, a zone or region associated with a speaking dais may be more likely to correspond to an organic object. In other embodiments, individual zone or regions may be associated with a likelihood that an organic object may not be present. For example, a zone or region associated with a wall-mounted display screen that is fixed to a wall may be associated with a lower likelihood or low likelihood that an organic object is present. In some embodiments, the zones may be configured utilizing some form of graphical user interface to elicit user inputs. In other embodiments, at least some portion of zones may be predefined or pre-configured, such as during the installation or configuration of the conference device. In still other embodiments, at least some portion of zones may be dynamically determined or dynamically updated based on the implementation of the processor determination routine 200 and consistent determination of non-organic objects or a lack of liveliness (or low liveliness).

By way of example, performing a position determination on the detected person(s) (block 204) is conducted utilizing a plurality of image-capturing sensors and/or a plurality of various sensors, as depicted in the FIG. 3 image capture sensor 316, sensor S1 317, sensor S2 320, sensor S3 318, and sensor Sn 319 can be examples of the plurality of image capturing sensors and/or a plurality of various sensors. The captured sensor data is processed by the process, where the processors can implement bounding boxes from the object detected within the FOV of an electronic device. The implementation of the bounding boxes is utilized to determine the position of an object. The processors can utilize configurable criterion regarding the determination of an object being detected as an organic being by way of determining the position of various bounding boxes within the detected FOV of the electronic device. An example of the configuration can be, if a smaller object's bounding box is within, or close to a larger object's bounding box, then it could be determined the smaller object is in front of the larger object. Another example, if the smaller object's pixel location is within or close to the large object, then it could be said the smaller object is in front of the large object. The determination of a small or large object can be detected by the total number of pixels needed to bound an object. The processor can be configured in a desirable requirement to determine if an object is an organic being by way of the position of the detected object.

At block 205, the processor makes a determination if the detected object of the plurality of objects should be included within a video conference call, or if the objects should be excluded based on the characterized attributes. In some embodiments, a single characteristic or attribute (e.g., a characterization of a 2D object) may be controlling. In other embodiments, a combination of characteristics may be processed. For example, the conferencing device may utilize a weighting algorithm and thresholds to determine whether consideration of the characterizations or attributes as a whole is sufficient to characterize the object for exclusion or inclusion (or both). At block 206, the determined data is transmitted to a host conferencing application, where the objects that were detected to be an organic being are included within a framing feature. The determined data may be transmitted in accordance with established application programming interface (API) structures. The determined data can include various identifiers. Additionally, the determined data can include additional metadata, such as determined characteristics, data values, and the like.

The electronic device as mentioned previously may be comprised of a plurality of image-capturing sensors and a plurality of various sensors. The plurality of image-capturing sensors and a plurality of various sensors are utilized for the determination of an object detected being an organic being by day of processing, by the processor, the sensor data captured by the plurality of image-capturing sensors and various sensors comprised of the electronic device. The determination of the detected object being an organic being as mentioned previously is by way of the electronic device performing a 2D/3D test on the detected person(s) (as illustrated at block 202), performing a liveness test on the detected person(s) (as illustrated at block 203), performing a position determination on the detected person(s) (as illustrated at block 204), and the like. The processor can make a determination of an object being an organic being by any individual test of the electronic device performing a 2D/3D test on the detected person(s), performing a liveness test on the detected person(s), performing a position determination on the detected person(s) or by any combination of the electronic device performing a 2D/3D test on the detected person(s), performing a liveness test on the detected person(s), performing a position determination on the detected person(s). Accordingly, the order and sequential nature illustrated in processor determination routine 200 is illustrative and should not be construed as limiting.

By way of the processors determination the person that was detected is an organic being and not a representation of an organic being, the processor includes the detected person(s) (at block 205) in the teleconference framing. An example of the teleconference framing can be observed as depicted in FIG. 3 the teleconference framing of Person 1 312, the teleconference framing of Person 2 313, the teleconferencing framing of Person 3 314, the teleconferencing framing of Person 4 315.

FIG. 3 illustrates the electronic device 311 with various objects 307, 308, and 309, and Organic beings Person 1 304, Person 2 303, Person 3 305, and Person 4 306 within the FOV 310. The digital screen 300 is displaying a video conferencing session where Person 5 301 is framed in the video conferencing call as they are participating remotely, a FOV 310 representation 302 of what is observed within the FOV 310 of an electronic device 311, and the result of a determination of an organic being by way of framing the detected organic being within the FOV 310 of the electronic device 311. The framed organic being within the FOV 310 of the electronic device 311 are the framing of Person 1 312, framing of Person 2 313, framing of Person 3 314, and framing of Person 4 315. As described in detail above, the determination of an object detected being an organic being is done by processing sensor data of a plurality of image-capturing sensors and/or a plurality of various sensor S1 317, sensor S2 320, sensor S3 318, and sensor Sn 319. Image capture sensor 316 is a mere depiction of an image capture sensor and should not be used to limit the use of only one image capture sensor as sensor S1 317, sensor S2 320, sensor S3 318, and sensor Sn 319 may also be used to represent a plurality of image capture sensors.

The framing of an organic being in the FOV 310 of the electronic device 311 is represented by the lack of framing of the various objects 307, 308, and 309. The sensor data utilized to determine the presence of an organic being is also utilized to remove from video framing objects that are not determined to be an organic being.

Figure 4:
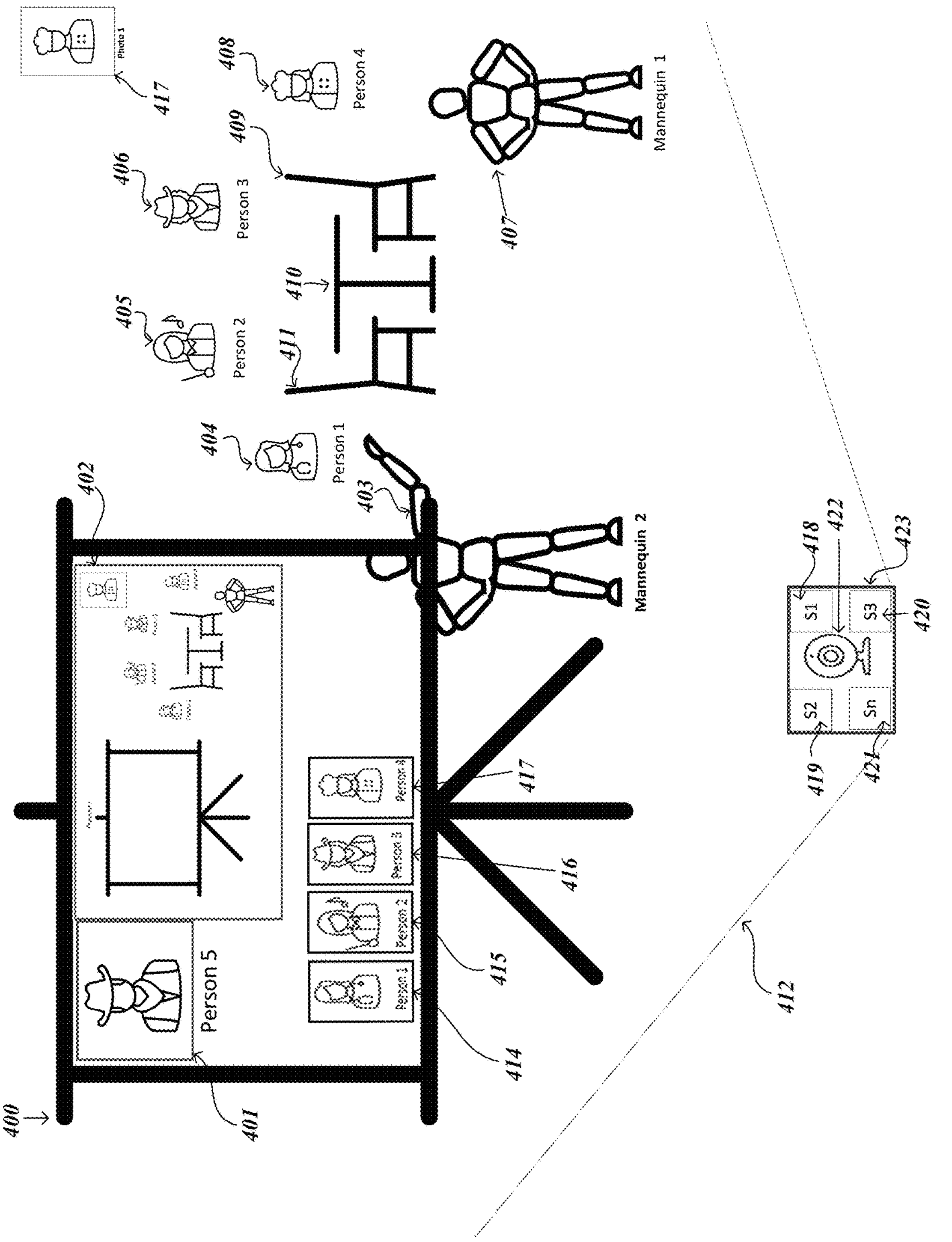
FIG. 4 is a pictorial depiction of a video conferencing system including a plurality of objects for detecting in the field of view of a video camera device, according to an example.

FIG. 4 illustrates the electronic device 423 with various objects 409, 410, and 411, Organic beings Person 1 404, Person 2 405, Person 3 406, and Person 4 408, digital screen 400, and representation of an organic being Mannequin 1 407, Mannequin 2 403, and Photo 1 417 within the FOV 412. As described in detail above, the determination of an object detected being an organic being is done by processing sensor data of a plurality of image-capturing sensors and/or a plurality of various sensors S1 418, S2 419, S3 420, and Sn 421. Image capture sensor 422 is a mere depiction of an image capture sensor and should not be used to limit the use of only one image capture sensor as S1 418, S2 419, S3 420, and Sn 421 may also be used to represent a plurality of image capture sensors. The processor processes the captured sensor data and determines to frame the organic beings within the FOV 412. The framed organic being within the FOV 412 of the electronic device 423 are the framing of Person 1 414, framing of Person 2 415, framing of Person 3 416, and framing of Person 4 417. The digital screen displays Person 5 401 framed as they are virtually participating in the conference call. The processor determined based on processing the sensor data, the representation of an organic being should not be framed as the lack of framing of Mannequin 1 407, Mannequin 2 403, and Photo 1 417 represents the determination of a representation of an organic being.

The digital screen 400 also displays a FOV 412 representation 402 of the electronic device 423. However, as observed in the FOV 412 representation 402 displayed on the digital screen 400, the representation of the digital screen 400 is removed from all displayed matter about the digital screen 400. The object detection of the electronic device 423 determines the object within the FOV 412 is a digital screen 400 and based on the captured sensor data, the processor can be configured to remove any displayed image on the FOV 412 representation 402 of the digital screen 400.

Figure 5:
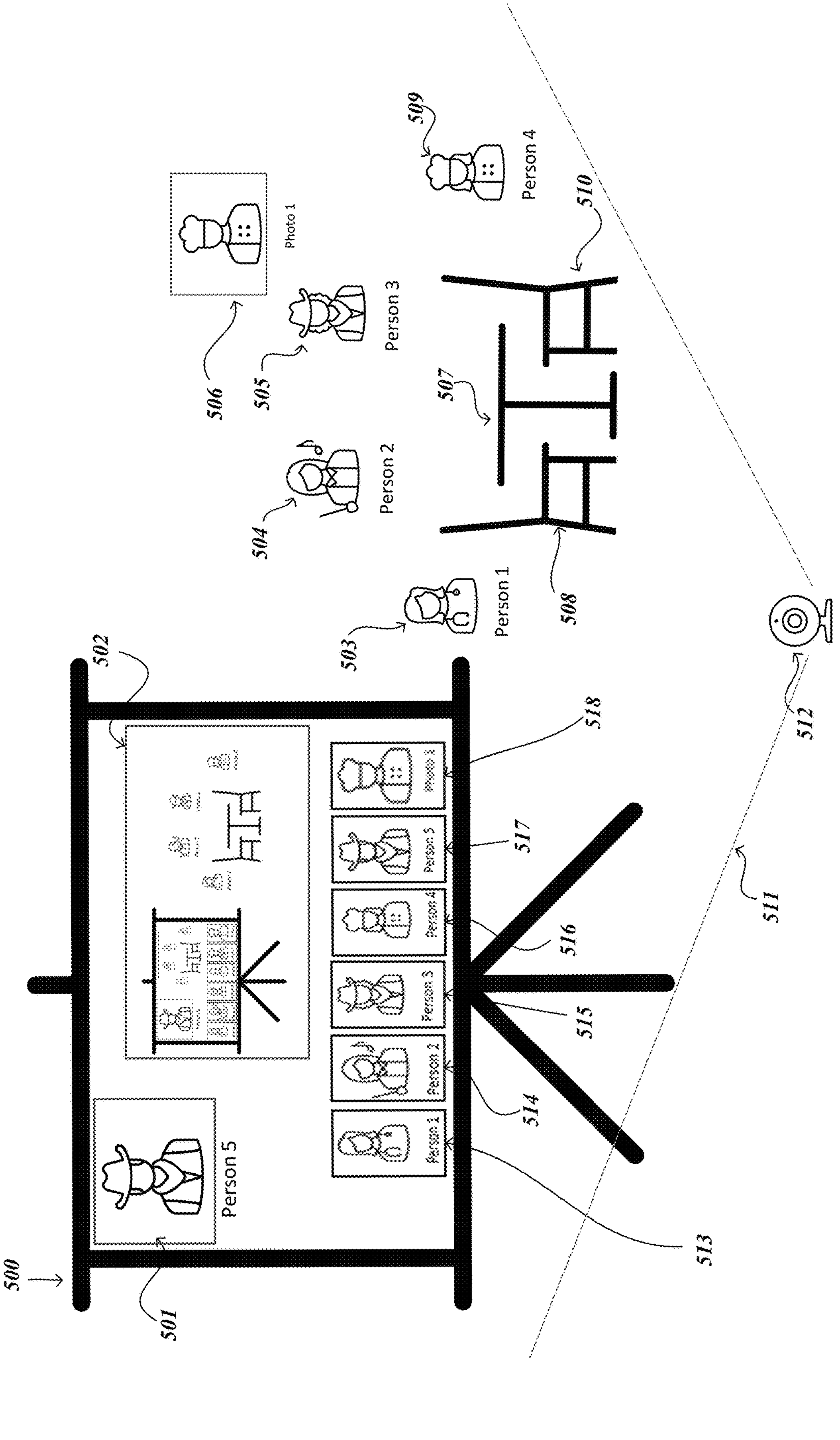
FIG. 5 is a pictorial depiction of a video conferencing system including a plurality of objects for detecting in the field of view of a video camera device, according to an example.

FIG. 5 illustrates another example of a problem video conferencing device 512 typically faces with a framing aspect. The conferencing device has a digital screen 500, Various objects 507, 508, and 510, Organic beings Person 1 503, Person 2 504, Person 3 505, Person 4 509, and a representation of an organic being Photo 1 506 and displayed on a digital screen 500 Person 5 501. The video conferencing device 512 is unable to distinguish between a representation of and organic being and an organic being, creating framing of any type of representation of a being within the video conferencing as sown by framing Person 1 513, framing Person 2 514, framing Person 3 515, framing Person 4 516, framing representation of Person 5 517, and framing representation of an organic being Photo 1 518.

The video conferencing device 512 is also unable to prevent the continuous loop as depicted on the digital screen 500 of the FOV 511 representation 502 of the conferencing device. As the digital screen 500 is within the FOV 511 of the conferencing device the continuous capturing of the digital screen 500 within the FOV 511 creates an infinite loop of the FOV 511 representation 502.

Figure 6:
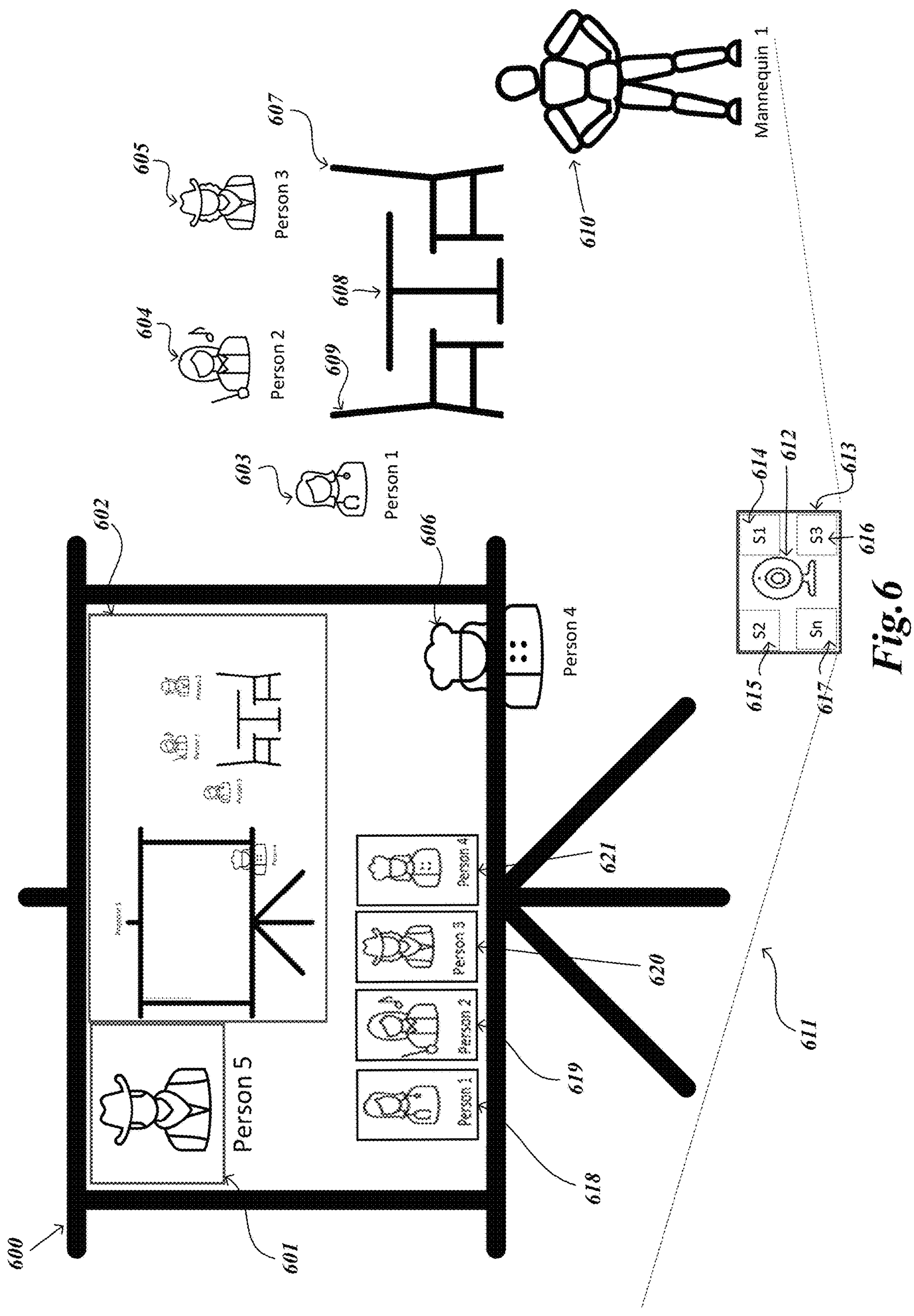
FIG. 6 is a pictorial depiction of a video conferencing system including a plurality of objects for detecting in the field of view of a video camera device, according to an example.

FIG. 6 illustrates the electronic device 613 with a digital screen 600, various objects 607, 608, and 609, Organic beings Person 1 603, Person 2 604, Person 3 605, and Person 4 606, and representation of an organic being Mannequin 1 610 within the FOV 611. As described in detail above, the determination of an object detected being an organic being is done by processing sensor data of a plurality of image-capturing sensors and/or a plurality of various sensors S1 614, S2 615, S3 616, and Sn 617. Image capture sensor 612 is a mere depiction of an image capture sensor and should not be used to limit the use of only one image capture sensor as S1 614, S2 615, S3 616, and Sn 617 may also be used to represent a plurality of image capture sensors. The processor can determine an region of interest based on the sensor data and determine if there is an organic being within the region of interest. As depicted in this figure Person 4 606 is within the region of interest, the region of interest is determined to be the digital screen 600 where an organic being may be placed in front of, or partially in front of, as they may be presenting to an audience.

The processor as previously mentioned can determine the object within the FOV 611 is a digital screen and based on the captured sensor data, the processor can be configured to remove any displayed image on the representation of the digital screen 602. As shown, Person 4 606 remains in the representation of the digital screen 602 and is determined to be an organic being by way of framing of Person 4 621. The processor, through the processing of the sensor data, frames the organic beings within the FOV 611 of the electronic device 613 by framing Person 1 618, framing Person 2 619, framing Person 3 620, and framing Person 4 621.

Figure 7:
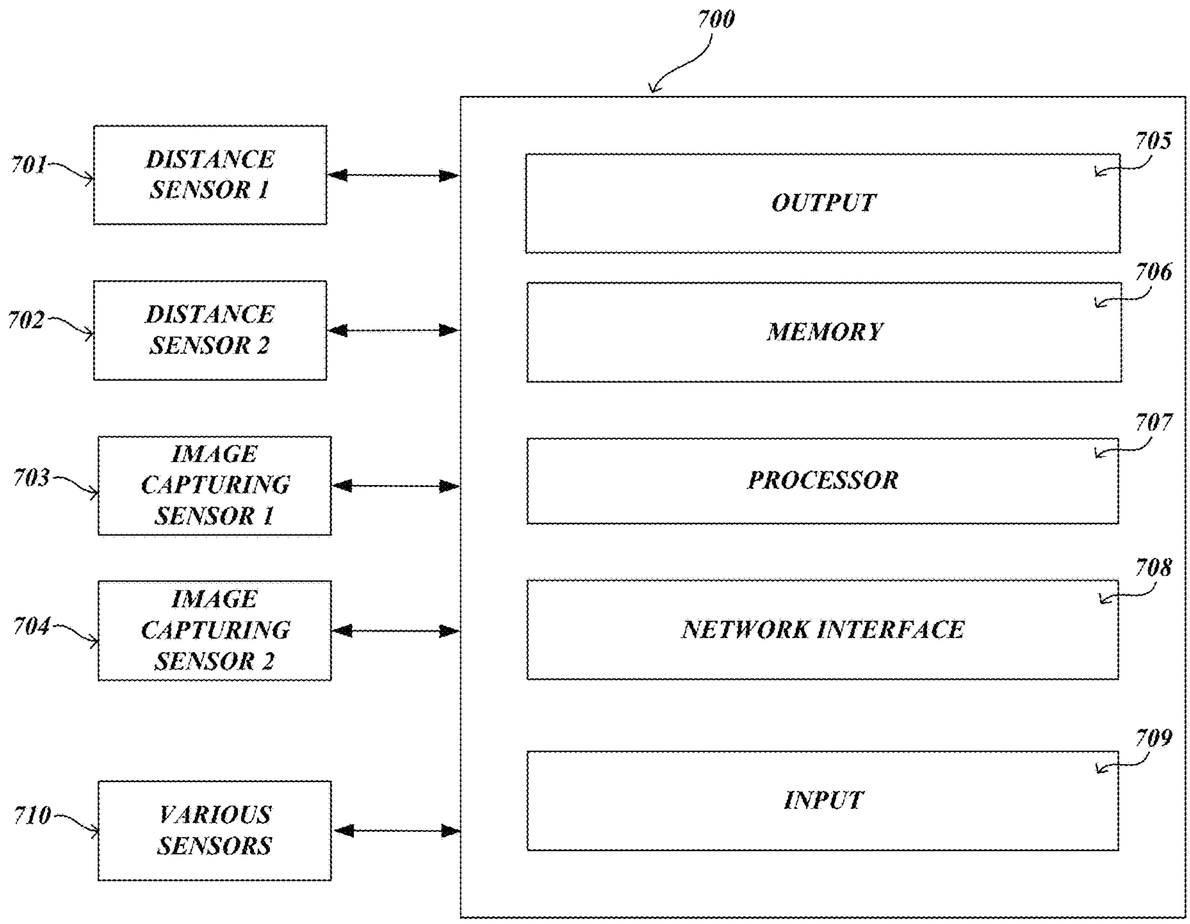
FIG. 7 illustrates a block diagram of an example architecture of the electronic device for processing the captured sensor data from the plurality of image-capturing sensors, distance sensors, and additional various sensors according to an example.

FIG. 7 depicts an example of an architecture of the electronic device that is configured to detect a plurality of objects within the FOV of the electronic device and determine if the objects within the FOV are organic beings and removes from framing the inorganic beings. The general architecture of the electronic device depicted in FIG. 7 includes an arrangement of hardware and software components that may be used to implement aspects of the electronic device 311 of FIG. 3. As illustrated the electronic device 700 includes various sensors 710, image capturing sensors 703 and 704, distance sensors 701 and 702, an input interface 709, a network interface 708, a processor 707, memory 706, and an output interface 705. The distance sensor 701, distance sensor 702, image capturing sensor 703, image capturing sensor 704, and various sensors 710 can be located on the electronic device or can be located remotely and can communicate with the electronic device via wired or wireless communication protocol.

The input interface 709, provides the processor 707 sensor data capture from the distance sensors 701 and 702, the image capturing sensors 703 and 704, and the various sensors 710. The input interface 709 can also accept input from the optional input device, such as a keyboard, mouse, digital pen, etc. In some cases, the electronic device 311 may include more (or fewer) components than those shown in FIG. 3.

The output interface 705 can provide connectivity to a display configured to present the video conferencing event, where the electronic device is configured to provide a live video and audio stream to a host application, where the host application is presented on the screen.

The network interface 708 can provide connectivity to one or more networks or computing systems. The processor 707 can thus receive information and instructions from other computing systems or services via a network. The processor 707 can also communicate to and from memory 706 and further provide output information for the display via the output interface 705.

The memory 706 can correspond non-transitory computer-readable medium that includes computer program instructions that the processor 707 executes in order to implement one or more examples of the electronic device system. The memory 706 generally includes RAM, ROM, or other persistent or non-transitory memory. The memory 706 can store an operating system that provides computer program instructions for use by the processor 707. The memory 706 can further include computer program instructions and other information for implementing aspects of the electronic device system. For example, the memory 706 includes host application software for communicating with the computing devices or the conferencing services by the network interface 708.

Figure 8:
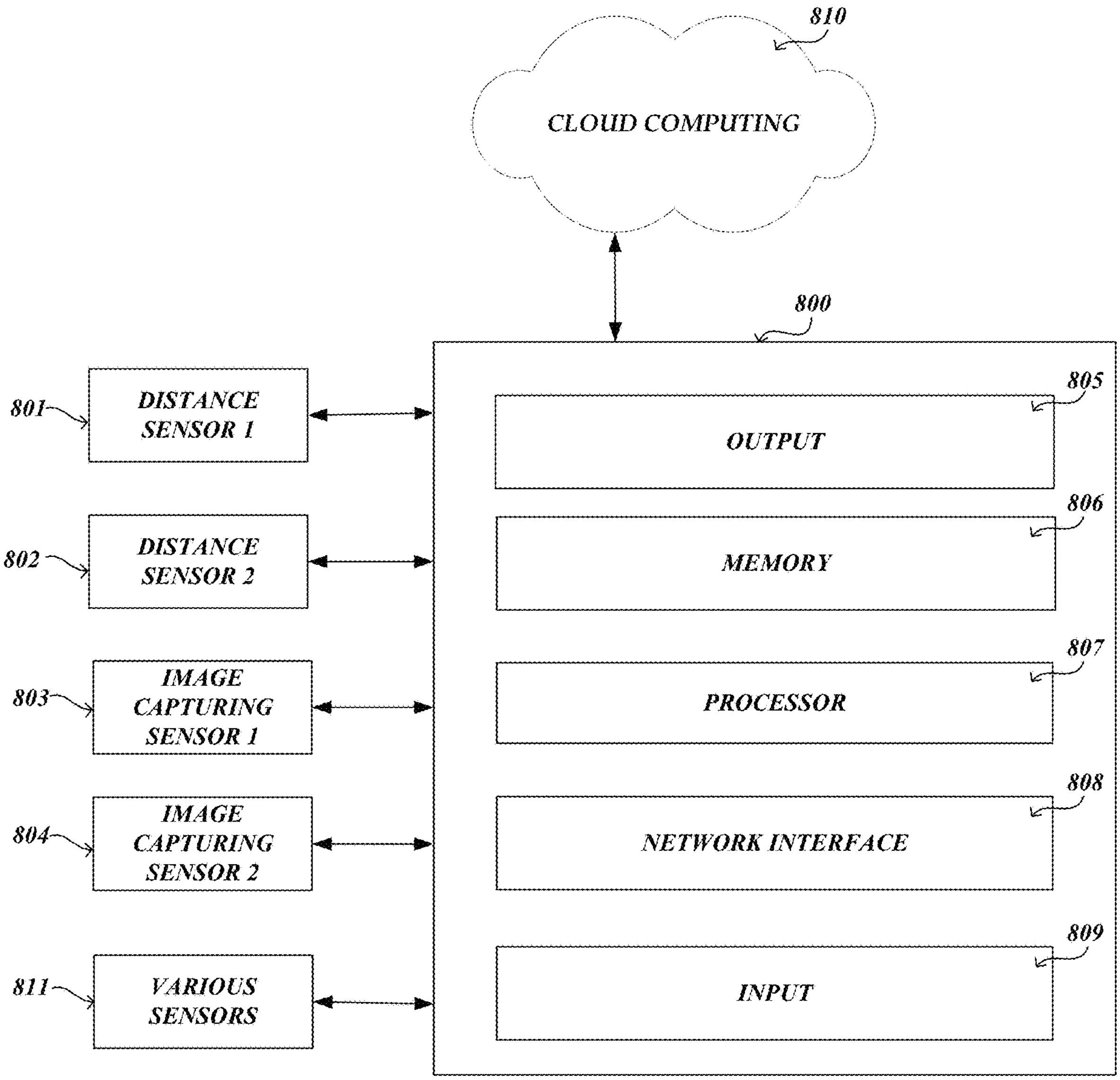
FIG. 8 illustrates a block diagram of an example architecture of a network-based service for processing the captured sensor data from the plurality of image-capturing sensors, distance sensors, and additional various sensors according to an example.

FIG. 8 depicts an example of an architecture of the electronic device that is configured to detect a plurality of objects within the FOV of the electronic device and determine if the objects within the FOV are organic beings and removes from framing the inorganic beings. The general architecture of the electronic device depicted in FIG. 8 includes an arrangement of hardware and software components that may be used to implement aspects of the electronic device 311 of FIG. 3. As illustrated the electronic device 800 includes a plurality of various sensors 811, the of image capturing sensors 803 and 804, distance sensors 801 and 802, an input interface 809, a network interface 808, a processor 807, memory 806, and an output interface 805. The distance sensors 801, distance sensor 802, image capturing sensors 803, image capturing sensors 804, and plurality of various sensors 811 can be located on the electronic device or can be located remotely and can communicate with the electronic device via wired or wireless communication protocol.

The input interface 809, provides the processor 807 sensor data capture from the distance sensor 801 and 802, the image capturing sensors 803 and 804, and the plurality of various sensors 811. The input interface 809 can also accept input from the optional input device, such as a keyboard, mouse, digital pen, etc. In some cases, the electronic device 311 may include more (or fewer) components than those shown in FIG. 3.

The output interface 805 can provide connectivity to a display configured to present the video conferencing event, where the electronic device is configured to provide a live video and audio stream to a host application, where the host application is presented on the screen.

The network interface 808 can provide connectivity to one or more networks or computing systems. The processor 807 can thus receive information and instructions from other computing systems or services via a network. The processor 807 can also communicate to and from a memory 806 and further provide output information for the display via the output interface 805.

The memory 806 can correspond to non-transitory computer-readable media that includes computer program instructions that the processor 807 executes in order to implement one or more examples of the electronic device system. The memory 806 generally includes RAM, ROM, or other persistent or non-transitory memory. The memory 806 can store an operating system that provides computer program instructions for use by the processor 807. The memory 806 can further include computer program instructions and other information for implementing aspects of the electronic device system. For example, the memory 806 includes host application software for communicating with the electronic device 800 or a conferencing service by the network interface 808.

The electronic device can be configured to communicate with a cloud computer 810 where the cloud computer processes data received from the network interface 808. Where the cloud computer 810 is utilized to offload the previously described processing requirements of the electronic device to the cloud processor. An example of the electronic device processor offloading to a cloud process, the processor transmits sensor data to the cloud processor, where the cloud processor makes a determination to remove the content of a digital screen as shown on the representation of the live FOV on the digital screen 602 of FIG. 6 of an electronic device as displayed on the digital screen 600 of FIG. 6 and frames the organic beings as shown in FIG. 6 by the framing of Person 1 618, framing of Person 2 619, framing of Person 3 620, and framing of Person 4 621.

Conditional language such as, among others, "can," "could." "might." or "may," unless specifically stated otherwise, are otherwise understood within the context as used in general to convey that certain examples include, while other examples do not include, certain features, elements, and/or blocks. Thus, such conditional language is not generally intended to imply that features, elements, and/or blocks are in any way required for any examples or that any example necessarily includes logic for deciding, with or without user input or prompting, whether these features, elements, and/or blocks are included or are to be performed in any particular example.

Disjunctive languages such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include computer-executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An electronic device comprising:

a video capture sensor;

a second sensor; and a processor to:

process sensor data captured by the video capture sensor;

detect, from the sensor data captured by the video capture sensor, an object located in a field of view (FOV) of the video capture sensor;

determine an attribute of the detected object based on sensor data captured by the second sensor according to a criterion;

remove the detected object from a teleconference framing based on the attribute;

detect, from the sensor data captured by the video capture sensor, a second object located in the FOV of the video capture sensor;

determine a second attribute of the second detected object based on sensor data captured by the second sensor according to the criterion; and not remove the second detected object from the teleconference framing responsive to determining that the second detected object is located partially in front of a display screen and within the FOV of the electronic device, based on the second attribute of the second detected object.

2. The electronic device of claim 1, wherein the attribute corresponds to unique facial identifiers as defined in the criterion.

3. The electronic device of claim 2, wherein the processor is to remove the detected object responsive to determining that the detected object matches unique facial identifiers of the second detected object from the sensor data.

4. The electronic device of claim 1, wherein the processor is to remove the detected object responsive to determining that the attribute of the detected object indicates that the detected object is two-dimensional (2D) as defined in the criterion.

5. The electronic device of claim 1, wherein the processor is to remove the detected object responsive to determining that the attribute of the detected object indicates that a position of the detected object is within a region of interest as defined in the criterion.

6. The electronic device of claim 1, wherein:

the second sensor comprises an Indirect Time of Flight (IToF) sensor; and the processor is to:

detect, from the sensor data captured by the video capture sensor, a third object located in the FOV of the video capture sensor;

determine a liveness attribute of the third detected object based on sensor data captured by the ITOF sensor according to the criterion; and not remove the third detected object from the teleconference framing responsive to determining that the liveness attribute indicates that the third detected object is a living organic being as defined in the criterion.

7. The electronic device of claim 1, wherein the detected object is associated with a unique identifier as defined in the criterion.

8. The electronic device of claim 1, wherein:

the electronic device comprises a third sensor; and the processor is to:

determine a third attribute of the detected object based on sensor data captured by the third sensor according to the criterion; and remove the detected object from the teleconference framing based on the third attribute.

9. A non-transitory computer-readable medium comprising computer-executable instructions that, when executed by a processor, cause the processor to:

detect a plurality of objects in captured video sensor data;

identify a first object of the plurality of objects based on the captured video sensor data;

identify a second object of the plurality of objects based on the captured video sensor data;

determine a first liveness attribute of the first object based on the captured video sensor data;

remove the first object from a teleconference framing based on the first liveness attribute;

determine a second liveness attribute of the second object based on the captured video sensor data; and not remove the second object from the teleconference framing based on the second liveness attribute.

10. The non-transitory computer-readable medium of claim 9, wherein the instructions, when executed by the processor, further cause the processor to segment the plurality of objects and assign an identification to each of the plurality of objects for object tracking.

11. The non-transitory computer-readable medium of claim 9, wherein the instructions, when executed by the processor, further cause the processor to identify the first object for exclusion responsive to determining that the first object corresponds to an image captured from a display screen.

12. The non-transitory computer-readable medium of claim 9, wherein the instructions, when executed by the processor, further cause the processor to determine the first liveness attribute based on facial feature movements of the captured video sensor data.

13. The non-transitory computer-readable medium of claim 9, wherein the instructions, when executed by the processor, further cause the processor to determine the first liveness attribute based on a pattern of apparent motion of the plurality of objects between two consecutive frames of the captured video sensor data.

14. The non-transitory computer-readable medium of claim 9, wherein the instructions, when executed by the processor, further cause the processor to configure a rule corresponding to a characterization of an environmental attribute of the plurality of objects based on an attributed temperature of the plurality of objects.

15. A computer-implemented method, the method comprising:

identifying a first object that is within a field of view (FOV) of a video conferencing device using video data generated by the video conferencing device;

identifying a second object that is within the FOV of the video conferencing device using the video data generated by the video conferencing device;

determining a first liveness attribute associated with the first object using the video data generated by the video conferencing device, the first liveness attribute being indicative of whether the first object is a first living organic being;

removing the first object from a video conference framing based on the first liveness attribute;

determining a second liveness attribute associated with the second object using the video data generated by the video conferencing device, the second liveness attribute being indicative of whether the second object is a second living organic being; and not removing the second object from the video conference framing based on the second liveness attribute.

16. The method of claim 15, wherein determining the first liveness attribute comprises determining a heat signature associated with the first object using data generated by an infrared camera.

17. The method of claim 15, wherein determining the first liveness attribute comprises determining whether the first object is a two-dimensional (2D) object or a three-dimensional (3D) object using data generated by an Indirect Time of Flight (IToF) sensor.

18. The method of claim 15, wherein determining the first liveness attribute comprises detecting facial feature movements associated with the first object using the video data generated by the video conferencing device, the facial feature movements comprising blinking eyes or moving lips.

19. The method of claim 15, wherein removing the first object from the video conference framing is based on a determination that the first object is located within a region of interest, the region of interest being associated with a digital screen that is within the FOV of the video conferencing device.

20. The non-transitory computer-readable medium of claim 9, wherein the instructions, when executed by the processor, further cause the processor to determine the first liveness attribute and the second liveness attribute based on data from an Indirect Time of Flight (IToF) sensor.

* * * * *